United States Patent
Wright et al.

(10) Patent No.: US 12,243,056 B2
(45) Date of Patent: Mar. 4, 2025

(54) COMPUTER-IMPLEMENTED SYSTEMS AND METHODS FOR IMPLEMENTING TRANSFERS OVER A BLOCKCHAIN NETWORK

(71) Applicant: nChain Licensing AG, Zug (CH)

(72) Inventors: Craig Steven Wright, Cardiff (GB); Jack Owen Davies, Cardiff (GB); Alexander Tennyson Mackay, Cardiff (GB)

(73) Assignee: nChain Licensing AG, Zug (CH)

( * ) Notice: Subject to any disclaimer, the term of this patent is extended or adjusted under 35 U.S.C. 154(b) by 523 days.

(21) Appl. No.: 17/431,099

(22) PCT Filed: Jan. 30, 2020

(86) PCT No.: PCT/IB2020/050735
§ 371 (c)(1),
(2) Date: Aug. 13, 2021

(87) PCT Pub. No.: WO2020/165677
PCT Pub. Date: Aug. 20, 2020

(65) Prior Publication Data
US 2022/0129887 A1    Apr. 28, 2022

(30) Foreign Application Priority Data

Feb. 15, 2019  (GB) .................................... 1902086
Feb. 15, 2019  (GB) .................................... 1902088
(Continued)

(51) Int. Cl.
*G06Q 20/30* (2012.01)
*G06Q 20/06* (2012.01)
(Continued)

(52) U.S. Cl.
CPC ......... *G06Q 20/389* (2013.01); *G06Q 20/065* (2013.01); *G06Q 20/0658* (2013.01);
(Continued)

(58) Field of Classification Search
CPC ............... G06Q 20/389; G06Q 20/065; G06Q 20/0658; G06Q 20/223; G06Q 20/3678;
(Continued)

(56) References Cited

U.S. PATENT DOCUMENTS

2016/0191243 A1    6/2016  Manning
2017/0132621 A1*   5/2017  Miller .................. H04L 9/0861
(Continued)

FOREIGN PATENT DOCUMENTS

CN    106503981 A    3/2017
CN    109074566      12/2018
(Continued)

OTHER PUBLICATIONS

Buterin, Vitalik, "Merkling in Ethereum", Ethereum Foundation Blog, Nov. 15, 2015, URL: https://blog.ethereum.org/2015/11/15/merkling-in-ethereum.
(Continued)

*Primary Examiner* — Radu Andrei
*Assistant Examiner* — Nakia Leffall-Allen
(74) *Attorney, Agent, or Firm* — Messner Reeves

(57) ABSTRACT

The invention provides improved Simplified Payment Verification (SPV) solutions for blockchain-implemented transfers. It is suited for, but not limited to, implementation in one or more SPV wallets, or on smart cards etc. In accordance with one embodiment, a method, system or resource(s) is provided which enables Alice to transfer an asset to Bob. Bob sends Alice a payment transaction template (template Tx3) and requests: the full transaction data for all input transactions (Tx1, Tx2) comprising at least one output that
(Continued)

Alice wants to spend as inputs to a transfer (Tx3); the Merkle path for all input transactions (Tx1, Tx2) linking them to their respective Merkle roots associated with their respective block headers; the completed transfer transaction (Tx3). Alice provides this information plus her signature and optionally a change address. Bob can then perform local SPV checks on the input transactions Tx1, Tx2 using transactions Tx1 and Tx2, their corresponding Merkle paths Path 1, Path 2, and Bob's local list of block headers. Bob broadcasts the transfer transaction (Tx3) to the P2P network.

12 Claims, 9 Drawing Sheets

(30) Foreign Application Priority Data

| | | | |
|---|---|---|---|
| Feb. 15, 2019 | (GB) | ...................... | 1902089 |
| Feb. 15, 2019 | (GB) | ...................... | 1902090 |
| Feb. 15, 2019 | (GB) | ...................... | 1902092 |

(51) Int. Cl.

| | |
|---|---|
| *G06Q 20/22* | (2012.01) |
| *G06Q 20/36* | (2012.01) |
| *G06Q 20/38* | (2012.01) |
| *G06Q 20/40* | (2012.01) |
| *H04L 9/08* | (2006.01) |
| *H04L 9/30* | (2006.01) |
| *H04L 9/32* | (2006.01) |
| *G06Q 20/34* | (2012.01) |
| *H04L 9/00* | (2022.01) |

(52) U.S. Cl.
CPC ....... *G06Q 20/223* (2013.01); *G06Q 20/3678* (2013.01); *G06Q 20/38215* (2013.01); *G06Q 20/3823* (2013.01); *G06Q 20/3827* (2013.01); *G06Q 20/3829* (2013.01); *G06Q 20/4014* (2013.01); *H04L 9/0825* (2013.01); *H04L 9/088* (2013.01); *H04L 9/30* (2013.01); *H04L 9/3218* (2013.01); *H04L 9/3239* (2013.01); *G06Q 20/341* (2013.01); *G06Q 2220/00* (2013.01); *H04L 9/50* (2022.05); *H04L 2209/56* (2013.01)

(58) Field of Classification Search
CPC ......... G06Q 20/38215; G06Q 20/3823; G06Q 20/3827; G06Q 20/3829; G06Q 20/4014; G06Q 20/341; G06Q 2220/00; G06Q 20/40; H04L 9/0825; H04L 9/088; H04L 9/30; H04L 9/3218; H04L 9/3239; H04L 9/50; H04L 2209/56
See application file for complete search history.

(56) References Cited

U.S. PATENT DOCUMENTS

| | | | |
|---|---|---|---|
| 2017/0236121 A1 | 8/2017 | Lyons et al. | |
| 2019/0026146 A1 | 1/2019 | Peffers et al. | |
| 2020/0014531 A1 | 1/2020 | Falco et al. | |
| 2020/0104228 A1* | 4/2020 | Mac Brough | .......... G06Q 20/02 |
| 2020/0126075 A1 | 4/2020 | Fisch | |
| 2020/0252221 A1 | 8/2020 | Zamani | |
| 2020/0304518 A1 | 9/2020 | Thekadath et al. | |
| 2021/0073795 A1* | 3/2021 | Ruiz | .................... H04L 9/3215 |
| 2021/0160053 A1 | 5/2021 | Yang | |
| 2022/0046028 A1 | 2/2022 | Paavolainen | |
| 2022/0270093 A1* | 8/2022 | Futoransky | .......... G06Q 20/401 |
| 2023/0090296 A1* | 3/2023 | Feng | .......... H04L 9/50 705/44 |
| 2023/0144486 A1* | 5/2023 | Bono | .................... G06Q 20/02 705/39 |
| 2023/0214792 A1* | 7/2023 | Lee | .......... G06Q 20/02 705/75 |

FOREIGN PATENT DOCUMENTS

| | | |
|---|---|---|
| KR | 101924026 B1 | 11/2018 |
| TW | 201807633 A | 3/2018 |
| TW | I646480 B | 1/2019 |
| WO | 2018208106 A1 | 11/2018 |
| WO | 2018224954 A1 | 12/2018 |

OTHER PUBLICATIONS

Buterin, Vitalik, "Chain Interoperability" R3 Reports, Sep. 9, 2016, pp. 4-6 https://www.r3.com/wp-content/uploads/2018/04/Chain_Interoperability_R3.pdf.

Luu L. et al., SCP: A Computationally-Scalable Byzantine Consensus Protocol For Blockchains. IACR Cryptology ePrint Archieve, Dec. 4, 2015, pp. 1-16II. Problem & Challenges, B. SCOIN: A Scalable Cryptocurrency Citation is not enclosed due to copyright restrictions.

Ding, Donghui et al., InterChain: A Framework to Support Blockchain Interoperability. Dec. 31, 2018 2. Overview of Interchain, 3. Workflow, 3.1 Workflow for Asset Transfer, Second Asia-Pacific Work, URL: https://conferences.sigcomm.org/events/apnet2018/posters/6.pdf.

Ganne, Emmanuelle, Can Blockchain revolutionanize international trade? Blockchain & Money, Sep. 20, 2018, Whole document especially pp. 8-12, 20, World Trade Organization, Geneva, Swizterland URL: https://ocw.mit.edu/courses/15-s12-blockchain-and-moneyfall-2018/51c129201af1dc294b6488b670cac3ce_MIT15_S12F18_ses5.pdf.

Examination Opinion, UK Application No. GB1902089.0, Jul. 31, 2019.

Son Nguyen, A view of Plasma Cash for Ethereum, FINC Tech Blog—Meduim, Sep. 14, 2018, pp. 1-13, URL: https://medium.com;finc-engineering/a-view-of-plasma-cash-for-ethereum-b608b934ec67.

Satoshi Nakamoto, Bitcoin: A Peer-to-Peer Electronic Cash System, Oct. 31, 2008, pp. 1-9, URL: https://bitcoin.org/bitcoin.pdf.

Pedro Franco: Understanding Bitcoin: Cryptography, Engineering and Economics, In: "Understanding Bitcoin: Cryptography, Engineering and Economics", Nov. 24, 2014 (Nov. 24, 2014), Wiley, XP055580078, ISBN: 978-1-119-01916-9 pages ToC, Ch01-Ch08,Chll-Ch14,Bibl,, p. 50-p. 158.

Andreas M. Antonopoulos, Mastering Bitcoin—Unlocking Digital Cryptocurrencies, In: Mastering bitcoin :[unlocking digital cryptocurrencies], Dec. 20, 2014 (Dec. 20, 2014), O'Reilly Media, Beijing Cambridge Farnham Koln Sebastopol Tokyo, XP055306939, ISBN: 978-1-4493-7404-4.

Mike Hearn, FAQ on the payment protocol, Sep. 24, 2013 (Sep. 24, 2013), XP055687996, URL:https://bitcointalk.org/index.php?topic=300809.0, p. 1-p. 4.

Antonopoulos, Andreas M., "Bitcoin and blockchain, Technology supporting cryptocurrencies", Jul. 21, 2016, NTT Publishing Co., Ltd., pp. 147-182.

Dai, W. et al., SBLWT: A Secure Blockchain Lightweight Wallet Based on Trustzone, IEEE Access, [online], Aug. 15, 2018, vol. 6, pp. 40638-40648, URL: https://ieeexplore.ieee.org/document/8412192.

Sakakibara, Y. et al., "A Hardware-Based Caching System on FPGA NIC for Blockchain", IEICE Transactions on Information and Systems, Feb. 2, 2018, vol. E101-D No. 5, pp. 1350-1360.

Shi, F., Qin, Z. and Mccann, J. A., "OPPay: Design and Implementation of A Payment System for Opportunistic Data Services", 2017 IEEE 37th International Conference on Distributed Computing Systems, Jun. 2017, pp. 1618-1628.

(56) References Cited

OTHER PUBLICATIONS

Wright C., "Merkle Trees and SPV," Nov. 2019, 4 pages, Retrieved from the Internet URL: https://craigwright.net/blog/bitcoin-blockchain-tech/merkle-trees-and-spv/.

* cited by examiner

COMPUTER-IMPLEMENTED SYSTEMS AND METHODS FOR IMPLEMENTING TRANSFERS OVER A BLOCKCHAIN NETWORK

CROSS-REFERENCE TO RELATED APPLICATIONS

This application is the U.S. National Stage of International Application No. PCT/IB2020/050735 filed Jan. 30, 2020, which claims the benefit of United Kingdom Patent Application No. 1902086.6, filed Feb. 15, 2019, United Kingdom Patent Application No. 1902088.2, filed on Feb. 15, 2019, United Kingdom Patent Application No. 1902090.8, filed on Feb. 15, 2019, United Kingdom Patent Application No. 1902089.0, filed on Feb. 15, 2019, and United Kingdom Patent Application No. 1902092.4, filed on Feb. 15, 2019 the contents of which are incorporated herein by reference in their entireties.

FIELD OF THE INVENTION

This invention relates generally to the communication and transfer of resources via a network, and more particularly to transfers conducted over blockchain networks, and also digital wallets. The invention is suited, but not limited to, wallets for processing transfers of cryptocurrencies, tokens and other resources which are implemented on or communicated over a blockchain.

DETAILED DESCRIPTION

Figure 1:
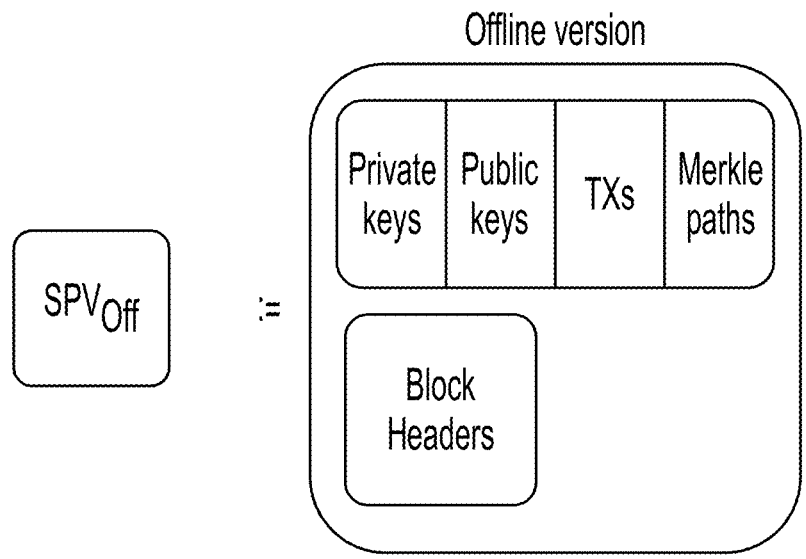
FIG. 1 shows an illustration of an "offline SPV wallet" in accordance with an embodiment of the disclosure.

This invention relates generally to the communication and transfer of resources via a network, and more particularly to transfers conducted over blockchain networks, and also digital wallets. The invention is particularly suited, but not limited to, wallets for processing transfers of cryptocurrencies, tokens and other resources which are implemented on or communicated over a blockchain. The invention provides apparatus and techniques which provide numerous technical advantages including but not limited to, improving the security, versatility, resilience and efficiency of digital wallets and blockchain-based communications.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention. The term "Bitcoin" is used herein to include all variations of protocols or implementations which derive from or implement any variant of the Bitcoin protocol. The term "user" may refer herein to a human or a processor-based resource.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. The header of each block contains a field which provides the Merkle root for that block. The Merkle root is generated by repeatedly hashing together pairs of transaction IDs from the block until a single hash is arrived at. This Merkle root provides an efficient mechanism for verifying that a transaction is part of a block because it allows users to verify a particular transaction without downloading the whole blockchain.

Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions. (Note: validation as described above should not be confused with the term "verification" as used herein to mean confirming or checking whether a particular transaction has been included in a block on the blockchain).

Once stored in the blockchain as a UTXO, a user can transfer control of the associated cryptocurrency to another address associated with an input in another transaction. This is often done using a digital wallet which stores the public and private key pairs associated with the user's cryptocurrency. There are various forms of known cryptocurrency wallet, including the SPV wallet (Simplified Payment Verification).

In a SPV-based exchange of cryptocurrency between Alice and Bob, both parties use the same type of SPV wallet. The SPV wallet stores the user's private and public keys, unspent transactions and block headers. It also has the ability to connect to the blockchain network. The term "block header" is known in the art, and is used to refer to data provided at the top of a block of blockchain transactions. The block header uniquely identifies the block so it can be located on the blockchain. It comprises fields of data that provide a unique summary or fingerprint of the entire block's contents. The block header includes the Merkle Root, which is a hash of all of the transactions in that block. A user is then able to search the Merkle tree with that root to check (i.e. verify) whether a particular transaction was included in a particular block on the blockchain, without having to download the entire blockchain.

An advantage of the SPV wallet is that it enables power and storage constrained devices such as phones and laptops to operate within the Bitcoin ecosystem because it only needs to check that a transaction has been verified (hence the name "simplified payment verification") rather than performing a full check of the blockchain as per other forms of wallet. Since an SPV wallet only downloads block headers without including any of the transactions, this reduces the storage space required from 159 GB (as of November 2018) to 43 MB, and storage requirements will only increase at a constant 4.2 MB per year even as Bitcoins scales.

Suppose that Alice wishes to send some cryptocurrency or a tokenised asset/resource to Bob. The communication flow between Alice and Bob, when using conventional SPV wallets, is as follows:
1. Alice creates a blockchain transaction (TX), specifying Bob's address in the output and providing signatures for inputs (from previous unspent transactions to Alice).
2. Alice broadcasts the transaction to the blockchain network.
3. Bob queries the network to verify that the transaction has been accepted.

In essence, the blockchain network acts as an intermediary between Alice's wallet and Bob's wallet. However, not only is this a resource-intensive process, it also requires network connectivity. If the device that the Alice's wallet is running on is offline for some reason, the transfer cannot be completed. Therefore, there are technical challenges including, but not limited to, how to provide methods, systems and devices for implementing a more reliable and efficient mechanism for conducting an electronic transfer from one entity (e.g. computing resource/node/digital wallet) to another.

Thus, it is desirable to provide a solution which solves at least these technical problems. Such an improved solution has now been devised. Thus, in accordance with embodiments of the present disclosure there is provided system(s) and method(s) as defined in the appended claims.

In accordance with the disclosure there may be provided a computer and/or blockchain implemented method and corresponding system. The system may comprise one or more computer-implemented resource(s). These may be hardware and/or software implemented resources.

Embodiments of the disclosure may provide a computer-implemented resource which may be operative to facilitate or enable a transfer of an asset (between a transferor and a transferee) on or over a blockchain network. The transferor (sender of the asset) may be referred to as Alice and the transferee (recipient of the asset) may be referred to as Bob. The asset may be or comprise any type of asset eg a portion of cryptocurrency or a token or anything else that can be transferred digitally in some way via a blockchain transaction.

Additionally or alternatively, the system may be operative to facilitate or enable verification of a blockchain transaction. This may be an SPV verification. The system may be described as a SPV system. The term "operative to" is used herein to include the terms "arranged" and "configured".

Embodiments of the disclosure may provide a system operative to facilitate a transfer of an asset on a blockchain between a transferor and a transferee, and comprising:
    a first verification resource comprising:
        complete transaction data relating to at least one blockchain transaction; and
        the complete Merkle path of the at least one blockchain transaction.
    and a second verification resource operative to:
        receive and/or request, from the first verification resource, the complete transaction data relating to the at least one blockchain transaction; and the Merkle path for the at least one blockchain transaction.

The transaction data may be complete in the sense of being sufficient to form a valid blockchain transaction in accordance with a blockchain protocol. It may be referred to as "full" transaction data. The first and/or second verification resources may, additionally or alternatively, be referred to as "transfer resources" or simply "computer-based resources".

The first verification resource may be substantially as disclosed herein in relation to Alice and/or in the section entitled "Offline SPV Wallet" and relevant figures. The first verification resource may be referred to hereafter as Alice, and the second verification resource may be referred to as Bob for convenience. the second verification resource may be substantially as described herein in relation to Bob, or the section entitled "PoS SPV Wallet" provided herein.

The second verification resource may be further operative to use the Merkle path to verify a Merkle proof for the at least one transaction.

Advantageously, the Merkle path can be provided to Bob from Alice rather than having to be obtained from peers on the blockchain network. This allows Bob to perform a local SPV check of the at least one transaction(s) without the need to access or communicate with the blockchain or network.

Moreover, data, requests and responses may be sent (directly) between Bob and Alice using an off-chain communication. The term "off chain communication" is intended to mean that the communication does not go via, query or interact with the blockchain or the blockchain network. Alice and/or Bob may not be nodes or peers on the network.

The second verification resource may be further operative to send a transaction to the blockchain upon successful verification of the Merkle proof. This may be Tx3 as described and disclosed herein and with reference to FIGS. 8 and 10. It may be a blockchain transaction comprising an input which spends an output (UTXO) of the at least one blockchain transaction.

The first and/or second verification resources may be or comprise a smart card, a digital wallet, a lightweight and/or SPV wallet.

The second verification resource may be operative to receive and/or request, from the first verification resource, the complete transaction data and the Merkle path using an off-chain communication. "Off chain" may mean that the communication does not involve, go via, or query the blockchain network and/or blockchain.

The system may be further operative to use the Merkle path to verify a Merkle proof for the at least one transaction and, upon successful verification, send a transaction to the blockchain. The verification may be performed (locally) at or by the second verification resource. It may be performed "off chain", meaning that it is not performed by querying or using the blockchain network or the blockchain.

The system may further comprise a plurality of second verification resources, and a coordination component operative to communicate with the plurality of verification resources. This may be substantially as disclosed herein as the "split merchant wallet".

The first verification resource may the transferor of the asset and the second verification resource may be the transferee of the asset.

The second verification resource may be operative to receive and/or request from the first verification resource, or the first verification resource is also operative to send to the second verification resource at least one of:
  a signature for spending an output of the at least one blockchain transaction;
  a transfer value; and/or
  a public key address.

The transfer value may be an amount of cryptocurrency or other resource. It may be the asset or value of the asset to be transferred. It may be a payment amount.

Embodiments of the disclosure also provide a blockchain implemented method. This may be a Simplified Payment Verification method. It may be arranged to facilitate a transfer of an asset on a blockchain between a transferor and a transferee comprising:
  receiving, at a second verification resource:
    complete transaction data relating to at least one blockchain transaction; and
    the complete Merkle path of the at least one blockchain transaction;
  wherein the transaction data and Merkle path are received from a first verification resource which stores the transaction data and Merkle path.

The method may further comprise the step of using the Merkle path to verify a Merkle proof for the at least one transaction The method may further comprise the step of sending a transaction to the blockchain upon successful verification of the Merkle proof.

The following steps may be performed off-chain:
  i) verification of the Merkle proof; and/or
  ii) receiving or requesting the complete transaction data and Merkle path from the first verification resource.

The first verification resource may be the transferor of the asset and the second verification resource may be the transferee of the asset. The second verification resource may be operative to send a transaction to the blockchain upon successful verification of the Merkle proof. The first and/or second verification resources may be or comprise a smart card, digital wallet or a lightweight and/or SPV wallet.

The disclosure also provides a non-transitory computer-readable storage medium having stored thereon executable instructions that, as a result of being executed by a processor of a computer system, cause the computer system to at least perform an embodiment of the method or system as claimed or disclosed herein.

Any feature described herein in relation to a system or resource is equally applicable to methods of the disclosure and vice versa.

These and other aspects of the present disclosure will be apparent from and elucidated with reference to, the embodiment described herein. Embodiments of the present disclosure will now be described, by way of example only, and with reference to the accompany drawings, in which:

FIG. 1 shows an illustration of an "offline SPV wallet" in accordance with an embodiment of the disclosure.

Figure 2:
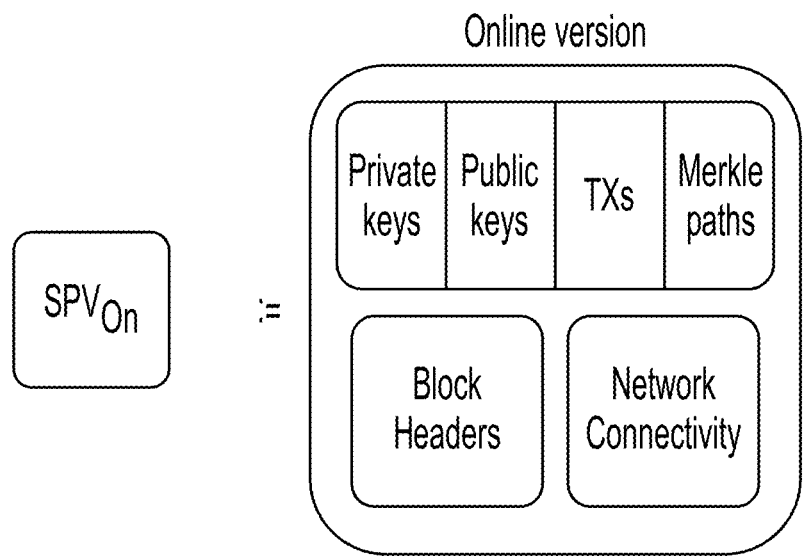
FIG. 2 shows an illustration of an "on- and off-line SPV wallet" in accordance with an embodiment of the disclosure.

FIG. 2 shows an illustration of an "on- and off-line SPV wallet" in accordance with an embodiment of the disclosure.

Figure 3:
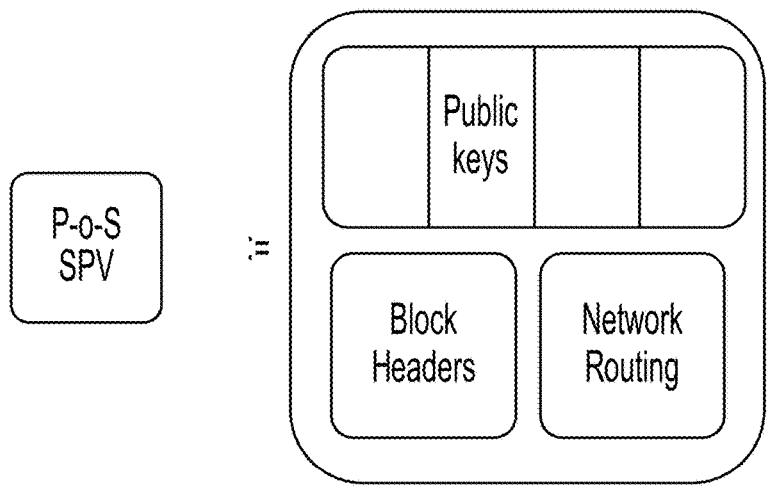
FIG. 3 shows an illustration of a "PoS SPV wallet" in accordance with an embodiment of the disclosure.

FIG. 3 shows an illustration of a "PoS SPV wallet" in accordance with an embodiment of the disclosure.

Figure 4:
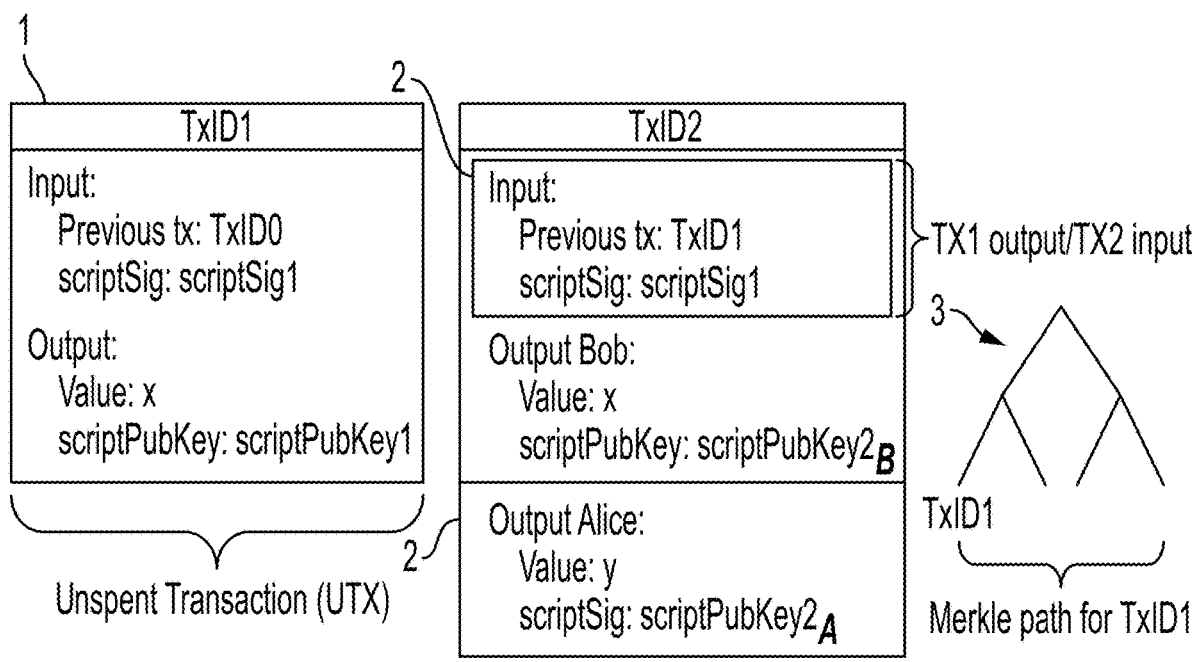
FIG. 4 shows a partial and completed template transaction and the associated Merkle proof in accordance with an embodiment of the disclosure.

FIG. 4 shows a partial and completed template transaction and the associated Merkle proof in accordance with an embodiment of the disclosure.

Figure 5:
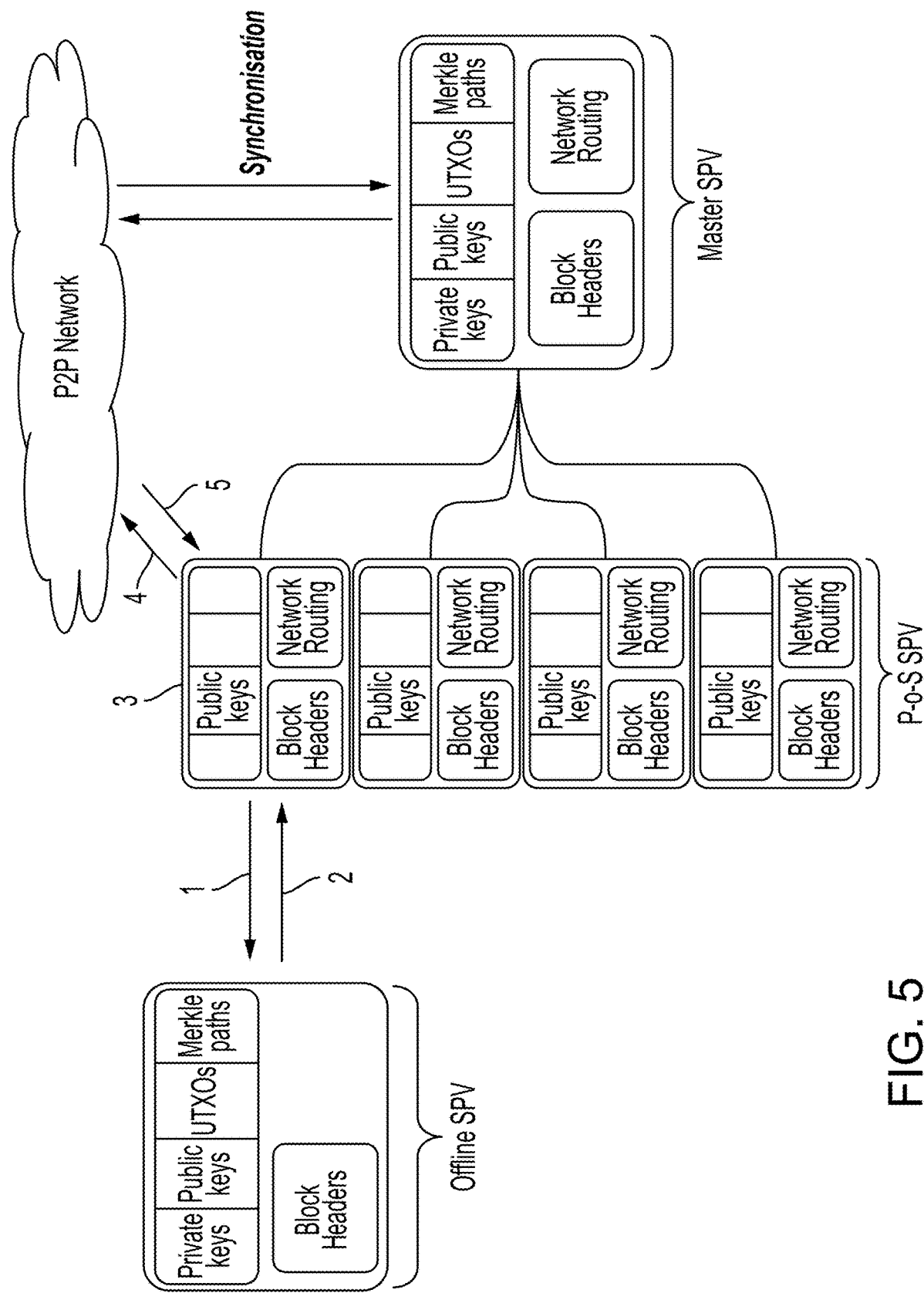
FIG. 5 shows the flow of data and interaction between Alice and Bob when conducting a transaction using a split SPV wallet in accordance with an embodiment of the disclosure.

FIG. 5 shows the flow of data and interaction between Alice and Bob when conducting a transaction using a split SPV wallet in accordance with an embodiment of the disclosure.

Figure 6:
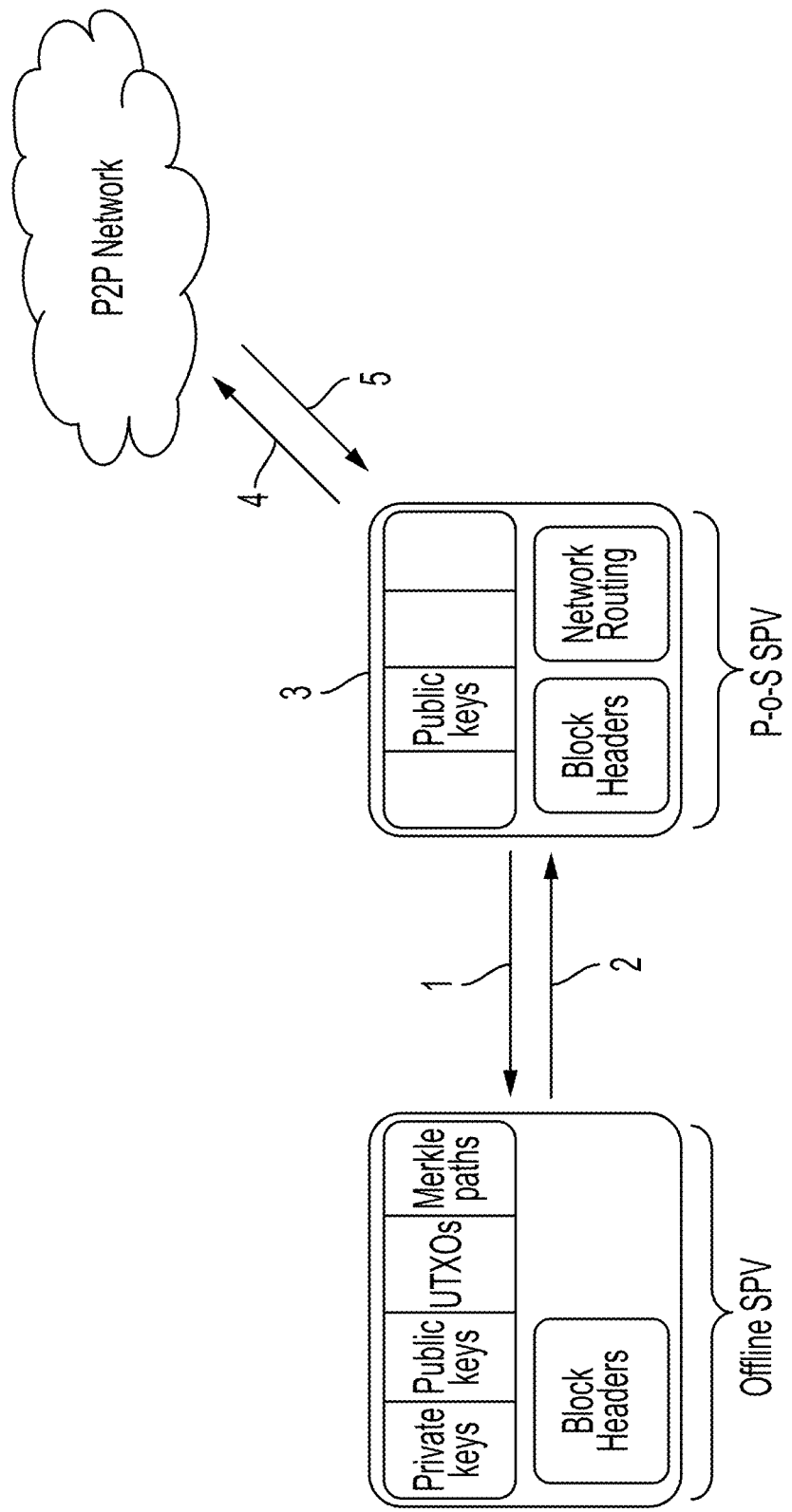
FIG. 6 shows a schematic illustration of an embodiment of the disclosure in use.

FIG. 6 shows a schematic illustration of an embodiment of the disclosure in use.

Figure 7:
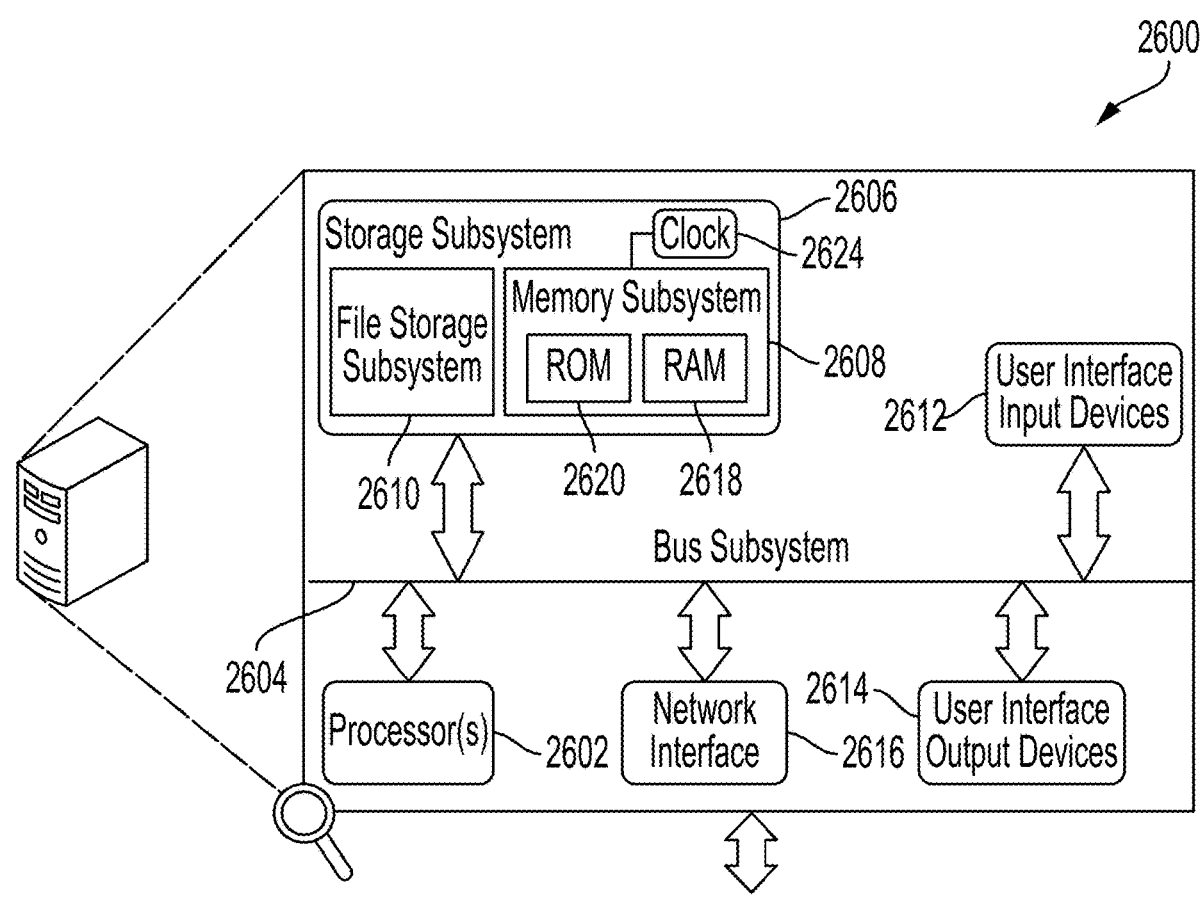
FIG. 7 is a schematic diagram illustrates a computing environment in which various embodiments can be implemented.

FIG. 7 is a schematic diagram illustrates a computing environment in which various embodiments can be implemented.

Figure 8:
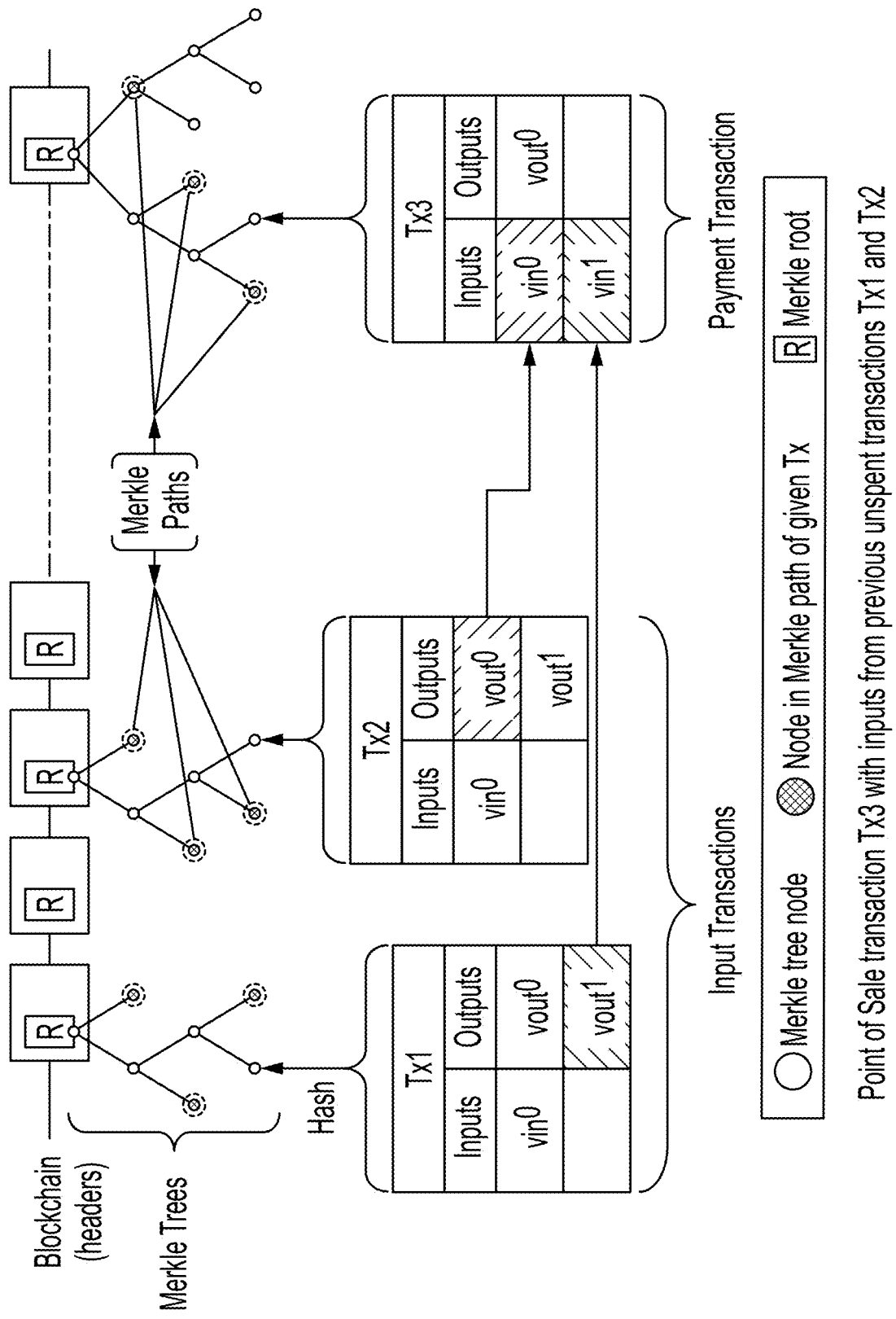
FIG. 8 is a schematic diagram showing three transactions and the Merkle paths which can be used to relate them to blocks (headers).

FIG. 8 is a schematic diagram showing three transactions and the Merkle paths which can be used to relate them to blocks (headers).

Figure 9:
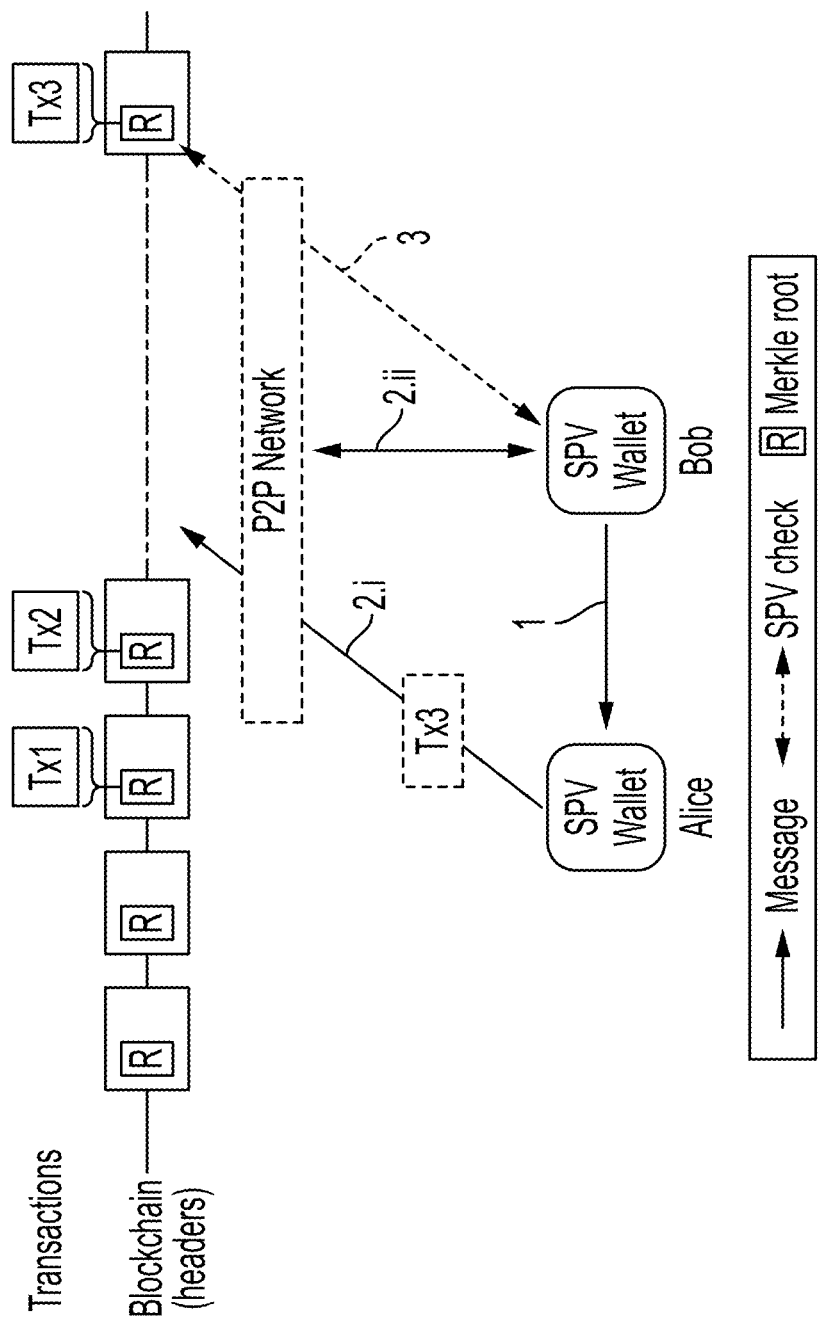
FIG. 9 illustrates the traditional SPV payment method.

FIG. 9 illustrates the traditional SPV payment method.

Figure 10:
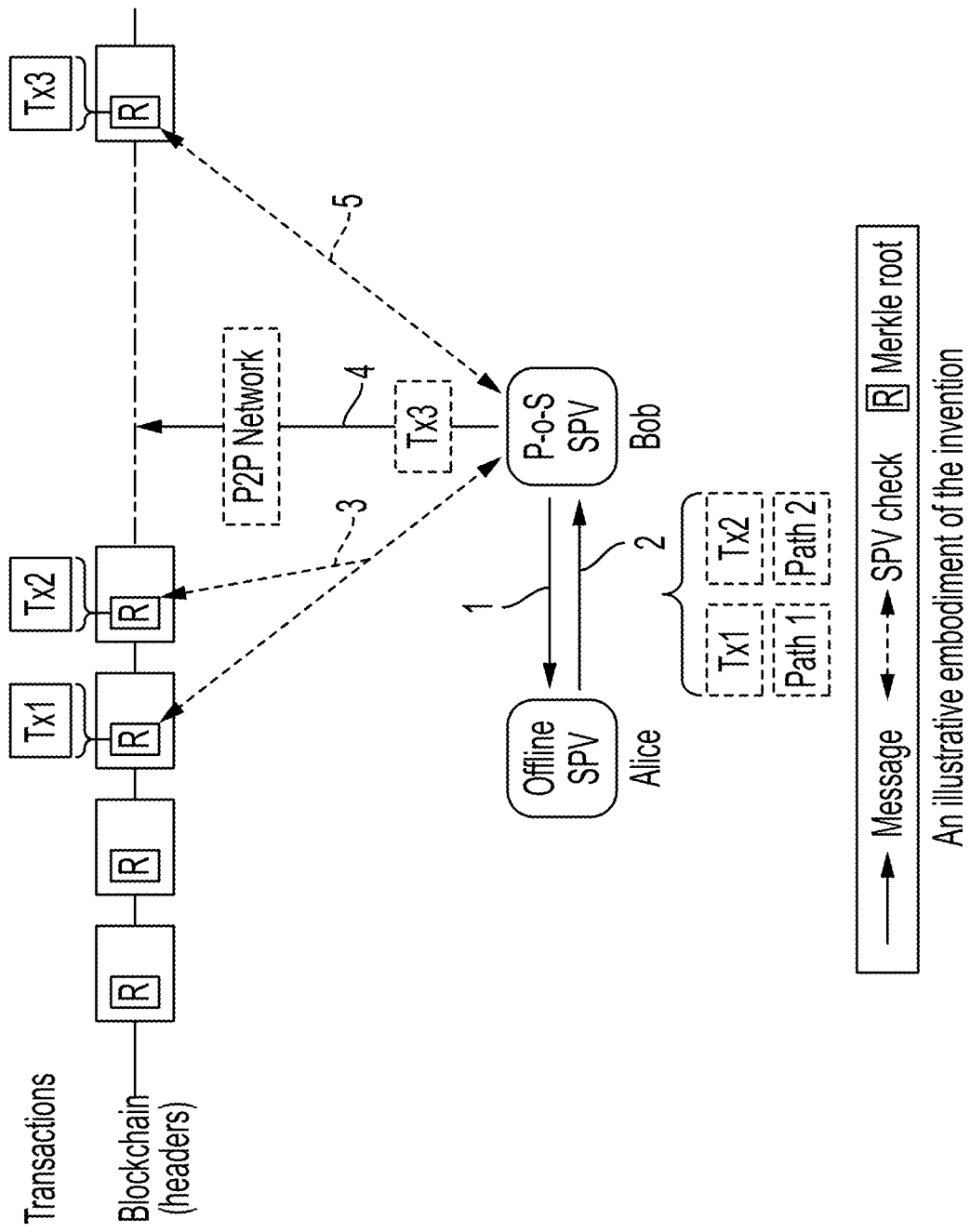
FIG. 10 shows an illustration of a method in accordance with an embodiment of the disclosure.

FIG. 10 shows an illustration of a method in accordance with an embodiment of the disclosure.

Figure 11:
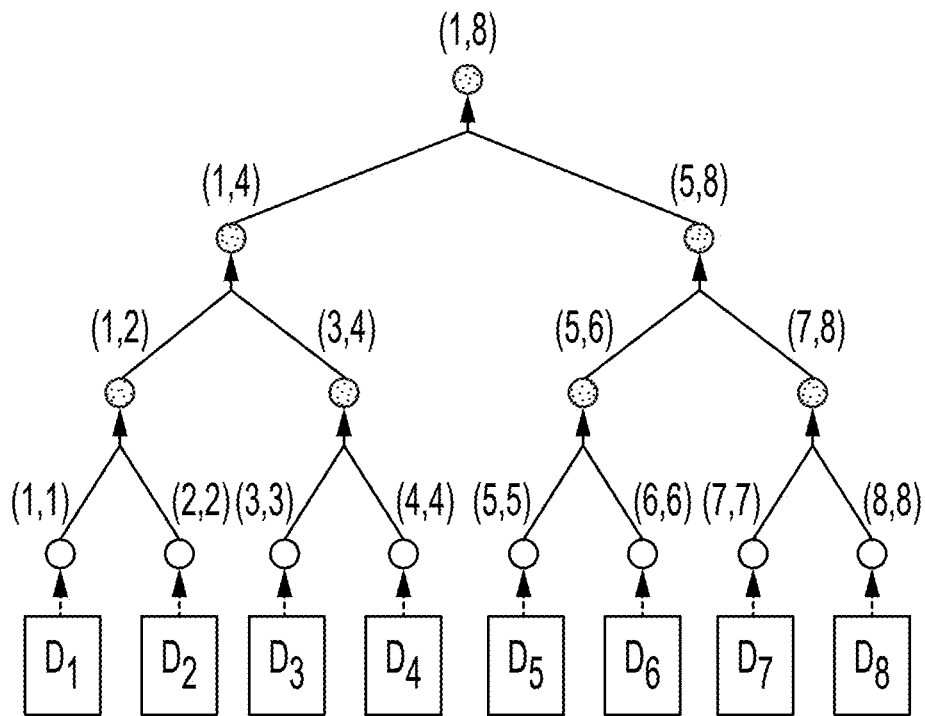
FIG. 11 shows an example of a binary Merkle tree as known in the prior art.

FIG. 11 shows an example of a binary Merkle tree as known in the prior art.

Figure 12:
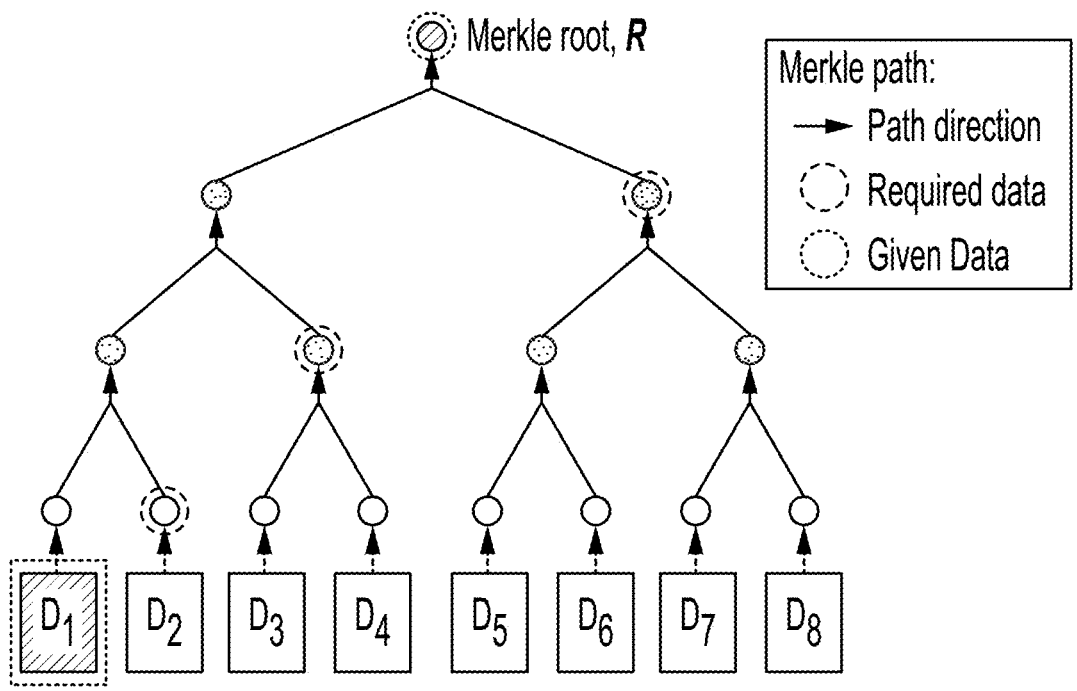
FIG. 12 shows a Merkle proof-of-existence of a data block $D_1$ in a tree represented by a root R, using a Merkle path, in accordance with the prior art.

FIG. 12 shows a Merkle proof-of-existence of a data block $D_1$ in a tree represented by a root R, using a Merkle path, in accordance with the prior art.

Prior Art: Merkle Trees

As embodiments of the present disclosure utilise the concept of a Merkle tree to advantage, we provide an explanation by way of background only.

Merkle Trees are hierarchical data structures that enable secure verification of collections of data. In a Merkle tree, each node in the tree has been given an index pair (i, j) and is represented as N(i, j). The indices i, j are simply numerical labels that are related to a specific position in the tree. An important feature of the Merkle tree is that the construction of each of its nodes is governed by the following (simplified) equations:

$$N(i, j) = \begin{cases} H(D_i) & i = j \\ H(N(i, k) \| N(k+1, j)) & i \neq j \end{cases},$$

where $k=(i+j-1)/2$ and H is a cryptographic hash function.

A labelled, binary Merkle tree constructed according to these equations is shown in FIG. 11, from which we can see that the i=j case corresponds to a leaf node, which is simply the hash of the corresponding $i^{th}$ packet of data $D_i$. The i≠j case corresponds to an internal or parent node, which is generated by recursively hashing and concatenating child nodes until one parent (the Merkle root) is found.

For example, the node N(1,4) is constructed from the four data packets $D_1, \ldots, D_4$ as $$N(1, 4) = H(N(1, 2) \| N(3, 4))$$
$$= [H(N(1, 1) \| N(2, 2)) \| H(N(3, 3) \| N(4, 4))]$$
$$= [H(H(D_1) \| H(D_2)) \| H(H(D_3) \| H(D_4))].$$

The tree depth M is defined as the lowest level of nodes in the tree, and the depth m of a node is the level at which the node exists. For example, $m_{root}=0$ and $m_{leaf}=M$, where M=3 in FIG. 11.

Merkle Proofs

The primary function of a Merkle tree is to verify that some data packet $D_i$ is a member of a list or set of N data packets $\mathcal{D} \in \{D_1, \ldots, D_N\}$. The mechanism for verification is known as a Merkle proof and consists of obtaining a set of hashes known as the Merkle path for a given data packet $D_i$ and Merkle root R. The Merkle path for a data packet is simply the minimum list of hashes required to reconstruct the root R by way of repeated hashing and concatenation, often referred to as the 'authentication path'. A proof-of-existence could be performed trivially if all packets $D_1, \ldots, D_N$ are known to the prover. This does however require a much larger storage overhead than the Merkle path, as well as requiring that the entire data set is available to the prover. The comparison between using a Merkle path and using the entire list is shown in the table below, where we have used a binary Merkle tree and assumed that the number of data blocks N is exactly equal to an integer power 2. If this were not the case, the number of hashes required for the Merkle proof would differ by ±1 in each instance.

TABLE

The relationship between the number of leaf nodes in a Merkle tree and the number of hashes required for a Merkle proof.

|  |  |  |  |  | Merkle tree |
|---|---|---|---|---|---|
| No. data packets | 8 | 32 | 64 | 256 | $N = 2^M$ |
| No. hashes required for proof-of-existence | 3 | 5 | 7 | 9 | $M = \log_2 N$ |

In this simplified scenario—where the number of data packets is equal to the number of leaf nodes—we find that the number of hash values required to compute a Merkle proof scales logarithmically. It is clearly far more efficient and practical to compute a Merkle proof involving $\log_K N$ hashes than to store N data hashes and compute the trivial proof.

Method

If, given a Merkle root R, we wish to prove that the data block $D_1$ belongs to the set $\mathcal{D} \in (D_1, \ldots, D_N)$ represented by R we can perform a Merkle proof as follows i. Obtain the Merkle root R from a trusted source.
ii. Obtain the Merkle path Γ from a source. In this case, Γ is the set of hashes:

$$\Gamma = \{N(2,2), N(3,4), N(5,8)\}.$$

iii. Compute a Merkle proof using $D_1$ and Γ as follows:
  a. Hash the data block to obtain:

$$N(1,1) = H(D_1).$$

b. Concatenate with N(2,2) and hash to obtain:

$$N(1,2) = H(N(1.1) \| N(2,2)).$$

c. Concatenate with N(3,4) and hash to obtain:

$$N(1,4) = H(N(1,2) \| N(3,4)).$$

d. Concatenate with N(5,8) and hash to obtain the root:

$$N(1,8) = H(N(1,4) \| N(5,8)),$$

$$R' = N(1,8).$$

e. Compare the calculated root R' with the root R obtained in (i):
    I. If R'=R, the existence of $D_i$ in the tree and therefore the data set $\mathcal{D}$ is confirmed.
    II. If R'≠R, the proof has failed and $D_1$ is not confirmed to be a member of $\mathcal{D}$.

This is an efficient mechanism for providing a proof-of-existence for some data as part of the data set represented by a Merkle tree and its root. For example, if the data $D_1$ corresponded to a blockchain transaction and the root R is publicly available as part of a block header then we can quickly prove that the transaction was included in that block.

The process of authenticating the existence of $D_1$ as part of our example Merkle tree is shown in FIG. 12 which shows a Merkle proof-of-existence of data block $D_1$ in the tree represented by a root R using a Merkle path. This demonstrates that performing the Merkle proof for a given block $D_1$ and root R is effectively traversing the Merkle tree 'upwards' by using only the minimum number of hash values necessary.

Certain embodiments of the present disclosure use these techniques to provide a more efficient and secure verification solution, which we now turn our attention to discussing.

Simplified Payment Verification (SPV)

As the present disclosure provides improved SPV solutions, we now provide an overview of known SPV verification techniques for ease of reference.

In what follows, we consider Alice (a customer) and Bob (a merchant) who wish to transact at the point-of-sale of some goods. We examine how this interaction takes place using simplified payment verification (SPV) using the traditional method, as outlined in the Nakamoto whitepaper ("Bitcoin: A Peer-to-Peer Electronic Cash System", Satoshi Nakamoto, [2008] www.bicoin.org/bitcoin.pdf). The same interaction is described later in respect of an illustrative embodiment of the present invention, in the section entitled "Overview of the Invention". In both cases, we consider the role of three blockchain transactions (Txs). Two transactions have spendable outputs (UTXOs) owned by Alice:

Tx1—a transaction with a spendable output (vout-1)
Tx2—a transaction with a spendable output (vout-0)

These transactions Tx1, Tx2 will be referred to herein as input transactions as a concise way of saying that they are transactions comprising outputs that are being spent by the inputs of some subsequent transaction e.g. a Tx3.

The third blockchain transaction is the payment transaction:

Tx3—a transaction using vout-0 and vout-1 as its two inputs and one output paying to Bob. There are only two inputs and one output for simpler demonstration of the invention.

These three transactions, and the Merkle paths which can be used to relate them to blocks (headers), are shown schematically in FIG. 8.

The basic concept of SPV has existed since the Nakamoto whitepaper and was implemented in the original Bitcoin client (v 0.1, 2009). In essence, SPV makes use of two properties of the Bitcoin blockchain:

1. Merkle proofs that can be used easily to verify that a given transaction is included in a Merkle tree and represented by a Merkle root; and
2. Block headers that represent blocks of transactions by including the Merkle root of a Merkle tree of transactions.

By combining these two properties a lightweight Bitcoin client need only maintain a copy of the block headers for the entire blockchain—rather than blocks in full—to verify that a transaction has been processed by the network. To verify that a given transaction has been processed and included in a block, an SPV client requires only:
a full list of up-to-date block headers;
the Merkle path for the transaction in question.

It follows from property 1 that the SPV user can verify that the given transaction is part of a Merkle tree—represented by a Merkle root—simply by performing a Merkle path authentication proof as explained in the section above. It then follows from property 2 that the transaction is also part of a block in the blockchain if the SPV client has a valid block header that includes this Merkle root. Performing this type of payment verification in bitcoin will be referred to herein as performing an 'SPV check'.

This SPV mechanism as specified by Nakamoto informs the existing method of SPV client implementation, including at the point-of-sale. Importantly, the state-of-the-art in SPV implementation is based on the paradigm whereby a user verifies that a payment has been received by confirming (to a suitable depth on the blockchain e.g. 6) that it has been included in a block. In effect, this is a post-broadcast check on a transaction to verify that it has been mined.

In contrast, the present invention requires that the necessary SPV check be performed on a transaction's inputs prior to its broadcast. This shift in emphasis greatly reduces the burden and traffic on the network in dealing with invalid transactions.

A second important paradigm in the existing SPV system is that an SPV client must query full nodes on the network to obtain the Merkle path required for the SPV check. This can be seen in the Bitcoin developer guide (bitcoin.org/en/developer-guide) which states that "the SPV client knows the Merkle root and associated transaction information, and requests the respective Merkle branch from a full node".

Embodiments of the present invention provide mechanisms and methods involving SPV checks that remove this burden on the network, by stipulating that lightweight bitcoin client users keep, maintain or at least have access to their own copies of Merkle paths pertinent to the unspent transaction outputs owned by them.

The traditional method for implementing SPV (at the point of transaction) is as follows, and with reference to FIG. 9:

[1] MESSAGE: Bob to Alice
Bob (merchant) sends Alice (customer) his public key address. His message may also include the amount that is to be paid, in addition to any other spending conditions provided as the hash of Bob's chosen redeem script.
Alice also communicates the transaction ID TxID3 of the payment transaction Tx3 to Bob (not shown).
[2] The P2P network mediates the exchange between Alice and Bob:
[2.i] MESSAGE: Alice to P2P network
Alice broadcasts Tx3 to the network.
[2.ii] MESSAGE: Bob to P2P network
Bob queries the network to check whether Tx3 is accepted for mining into the blockchain.
Bob sends continuous queries [2.ii] until he is satisfied the payment is deemed valid by the network. Note that he may begin querying before [2.i] has occurred.
If Bob is satisfied, he may treat the transaction as complete without either party waiting for the next block to be mined.
[3] SPV CHECK (MESSAGE): Bob to P2P network
Bob waits for the next block to be mined and downloads new block headers as they are broadcast on the network.
Bob sends an 'SPV check' request to the network. This is a request for the Merkle path corresponding to Tx3 that links it to the Merkle root in a recently-mined block.
If the network can provide Bob with the Merkle path, he can compute the Merkle proof himself using his SPV wallet and check the payment Tx3 has been processed.

This communication flow is illustrated in FIG. 9. It should be noted that [2.i], [2.ii] and [3] are mediated by the P2P network and thus contribute to traffic on the network. It should also be noted that in the existing SPV paradigm, the necessary SPV check [3] is performed:
After the payment (Tx3) is submitted;
On the payment (Tx3) itself;
With the help of other network peers who provide Merkle paths.

We now contrast this known approach with that of the present invention.

Overview of the Embodiments of the Disclosure

The present disclosure provides improved security solutions for verification on a blockchain network (which we will hereafter refer to as the "Bitcoin" network for convenience) using a low bandwidth SPV system. In accordance with an embodiment of the invention, the sender of the resource (e.g. customer) does not need to be online for the transaction to be created and/or accepted by the receiver (e.g. a merchant). Only the receiver needs to be online. For the sake of convenience and ease of reference, the term "customer" or "Alice" will be used instead of "sender", and "merchant" or "Bob" will be used instead of "receiver".

Embodiments of the present disclosure employ a novel communication flow between the parties relative to conventional SPV transactions, as it only requires the merchant's wallet to be connected to the network. This is achieved by the merchant's wallet creating a template (which may be referred to as an "incomplete transaction") with information that the customer needs to provide e.g. a change address, signature, etc. Once the merchant receives this requested information from the customer, he broadcasts the transaction to the network.

Thus, the disclosure gives rise to a fundamental change of the communication and exchange process between the transacting parties and the network during a simple payment verification on the Bitcoin network from:
Merchant→Customer→Network→Merchant
to:
Merchant→Customer→Merchant→Network
Alice and Bob may securely exchange messages using a secret sharing protocol such as, for example, that described in WO 2017145016.

This change in process gives rise to the technical problem of needing a novel design for both the customer wallet and also for the merchant wallet. Therefore, embodiments of the invention provide at least the following:
1. a novel customer wallet for Alice (which we will refer to as the "offline wallet"): this stores Alice's public keys, private keys, transactions containing spendable outputs, all block headers and, importantly, the Merkle paths of the stored transactions (which removes the requirement for Alice to be connected to the network)
2. a novel merchant wallet for Bob (which we will refer to as the "Point of Sale (PoS) wallet":
this stores Bob's public keys and all block headers.

A more detailed description of these components is now provided.

An illustrative method for implementing SPV (at the point of transaction) in accordance with an embodiment of the invention is provided as follows, with reference to FIG. 10:

[1] MESSAGE: Bob to Alice
Bob sends Alice a payment transaction template (template Tx3) and requests the following information from Alice:
The full transaction data for all input transactions (Tx1 and Tx2) comprising at least one output that Alice wants to spend as inputs to the payment (Tx3);
The Merkle path for all input transactions (Tx1 and Tx2) linking them to their respective Merkle roots associated with their respective block headers;
The completed (i.e. filled-in template) payment transaction (Tx3).
Note that Bob is requesting information from Alice, rather than sending his address.

[2] MESSAGE: Alice to Bob
Alice sends the requested information to Bob:
The full transaction data for all input transactions (Tx1 and Tx2) comprising at least one output that Alice wants to spend as input(s) to the payment (Tx3);
The Merkle path for all input transactions (Tx1 and Tx2) linking them to their respective block headers;
The completed (i.e. filled-in template) payment transaction (Tx3). In addition to filling in the template, Alice also provides her signature.

[3] SPV CHECK (LOCAL): Bob
Bob performs SPV checks on the input transactions Tx1 and Tx2 using:
The transactions Tx1 and Tx2;
The corresponding Merkle paths Path 1 and Path 2;
Bob's local list of block headers.
These checks are performed locally by Bob and do not go through the P2P network;
In a preferred embodiment, at this stage that Bob also performs appropriate checks on the payment Tx3 he has received from Alice to ensure that:
The payment Tx3 is as Bob expected;
Alice's signature(s) are valid for this transaction.

[4] MESSAGE: Bob to P2P network
Bob broadcasts the payment transaction (Tx3) to the P2P network. In the existing paradigm, Alice would submit the transaction to the network.
This is done only if the SPV check [3] on all inputs to Tx3 are affirmative.

[5] SPV CHECK (MESSAGE): Bob to P2P network
This step is identical to the step [3] in the existing paradigm of SPV methods (see earlier).

This communication flow is illustrated in FIG. 10. It should be noted that only [4] and [5] are mediated by the P2P network. Step [5] is nothing more than a repetition of the existing SPV technique and is not a necessary feature of our proposed method; it is included here for completeness and for distinction between the existing paradigm and the present invention.

Note that, in accordance with embodiments of the present disclosure, the necessary SPV check [3] is performed:

Before the payment transaction (Tx3) is submitted;
On the input transactions (Tx1 and Tx2) to the payment transaction (Tx3);
Without the help of network peers to provide Merkle paths (provided by Alice).

Features of embodiments of the invention include, but are not limited to:
Alice does not need to be online or submit any information to the network herself. This is more reliable for Alice. It also allows her to use a device, such as smart card, that does not have the capability of connecting to the network.
The inclusion of the Merkle path allows Bob to quickly reject any invalid inputs from Alice. This alleviates excess network traffic by refusing to submit 'spam' transactions with invalid Merkle paths.
Bob may have a particularly fast connection to the network and so it may be faster for him to validate a transaction.
Bob creates the transaction for Alice to sign and therefore has more control over the content of the transaction, for example he may choose to pay more in transaction fees which will ensure that the transaction is accepted by the network.
Bob's wallet does not need to contain any private keys. This increases security as the private keys cannot be accessed or compromised by an unauthorised third party.
The responsibility for submitting the transaction to the network relies on Bob.
Alice's SPV wallet must have a private key and the ability to sign the transaction. Therefore, it must have enough processing power to perform elliptic curve point multiplication.

We now consider the various components of arrangement in accordance with the disclosure in more detail.

Offline SPV Wallet

An embodiment of the offline SPV is shown schematically in FIG. 1 and comprises the following features:
1. TXs—Pre-loaded, full transaction data containing Alice's available unspent transaction outputs. This full transaction data in combination with a Merkle path constitutes a Merkle proof that the transaction Alice is spending is valid. Hashing the full transaction will give the transaction ID (TXID) which is required as part of the input data for the new transaction that Alice wishes to complete. Note that providing the TXID alone would be insufficient as Bob must be able to verify that the TXID is indeed the hash of the transaction. This is only possible if she provides Bob with the full transaction data, and hence she must store it or at least have access to it when required.
2. Private/Public Keys—The wallet must have access to a set of private keys in order to sign transaction outputs, and also to public keys to specify change addresses when conducting transactions.
3. Merkle Paths—The (complete) Merkle path of each of the transactions containing the transaction outputs (UTXOs). This will be used by the merchant's point of sale wallet to verify that the TXs are valid. It should be noted that while the Merkle proof provided by this wallet does not prevent a double spend, it does act as a fail-fast mechanism against spam attacks thus providing improved robustness and security of the wallet.
4. Minimal Processing—The offline SPV wallet is required to sign the unspent transactions in order to spend them. This requires the offline wallet (and device it is installed on) to be able to implement a cryptographic algorithm such as ECDSA, meaning that enough processing power is required to be able to perform elliptic curve point multiplication and compute hash functions.

5. Block Headers (optional)—the offline SPV wallet may wish to include block headers to verify that payments to point of sale SPV wallets have been processed. This would also require storing the TXIDs and Merkle paths after interaction with a point of sale wallet.

In one or more embodiments, the above may be implemented as a wallet with both online and offline states or functionality. This can be advantageous when the wallet needs to update its set of UTXOs and Merkle paths.

In such an embodiment, Alice's wallet can download data by temporarily connecting to the network in the same way that a traditional SPV wallet does. This is illustrated in FIG. 2, and may be referred to for convenience as an on- and off-line SPV wallet.

Once connected Alice's wallet can download the full transactions, Merkle paths and block headers. A standard P2PKH transaction as known in the art with 1 input and 2 outputs is 226 bytes, block headers are 80 bytes, and a Merkle path for a transaction in a block containing 100,000 transactions is approximately 560 bytes. Combining all three means that updating Alice's SPV wallet only needs to download less than 1 MB of data per new input. This can be achieved even with a low bandwidth connection, which is highly advantageous.

A wallet using this implementation is advantageous as it provides the benefits of being able facilitate offline payments and verification using a blockchain, while maintaining the ability to connect to the network as and when needed. The additional online state can be used for updating the list of block headers, obtaining new TXs and associated Merkle paths and even sending transactions as and when required.

There are multiple possible use cases for an on- and off-line SPV, including software applications and contactless payment cards.

PoS SPV Wallet

The PoS SPV wallet is designed to achieve the minimum functionality required for Bob to accept a transfer from Alice, who is using an offline SPV wallet as described above. These requirements are that Bob must be able to:

Generate a point of sale transaction template.
Compute Merkle proofs associated with block headers.
Connect and broadcast to the network, including queries of the UTXO set.
Manage public key addresses for receiving payment
Update his list of full TX data containing Alice's UTXOs.

All the above requirements are met by a PoS SPV wallet according to the schematic design shown in FIG. 3 and comprises the following features:

1. Block headers—the PoS SPV wallet maintains an up-to-date copy of a list of block header data corresponding to blocks in the blockchain. When presented with a transaction and its Merkle path, the PoS SPV wallet can perform a simple Merkle proof by repeated hashing to the Merkle root.

By comparing this root to the one in the relevant block header, Bob has an efficient fail-fast mechanism for detecting erroneous or fraudulent payments.

2. Network connectivity—the PoS SPV wallet has the ability to connect to the network. This includes—but is not limited to—the ability to broadcast a new signed transaction to the blockchain network and to query for the existence of specific UTXOs in the current UTXO set.

3. Public key storage—the PoS SPV wallet only needs to store the public key addresses to which Bob wants to receive the asset(s) or payment. This can be done in several ways such as, for example, by using a deterministic secret (such as disclosed in WO 2017/145016) or using a hierarchical deterministic wallet structure.

By only storing public key addresses—rather than the associated private keys—at the point of sale, security for 'card present' transaction is greatly improved as the Bob's private keys are not susceptible to compromise, and hence funds are protected.

4. Minimal processing—the PoS SPV wallet is required to perform only the minimum processing of a Merkle proof based on the template filled in by the Alice.

This greatly reduces the burden of iterating through and processing full blocks to obtain Merkle paths independently, which expedites the point of sale/transaction process, expedites the transfer of the resource across the network, and improves efficiency for both Bob and Alice.

It should be noted that, in at least one embodiment, the point of sale SPV wallet will maintain a copy of the entire list of block headers to ensure that Bob can always perform the SPV check on a Merkle path for any transaction in the history of the blockchain. However, it may be the case that Bob chooses not to keep the full list of block headers, for instance those corresponding to blocks containing no transactions with spendable outputs. In this case, it should be appreciated that Bob may need to query a third party occasionally to obtain block headers he does not already have. In the next section, we detail the Merchant point of sale template that Bob sends to Alice in accordance with one or more embodiments and it should be appreciated that, if Bob does not have a complete list of all block headers, he could incorporate a request for the block headers associated with her unspent transaction outputs into this template.

PoS SPV Wallet Template

Turning to FIG. 4, Bob's PoS SPV wallet requests the information for Alice's offline (or off/online) wallet in the following format:

1. TX/UTX—Full transaction data from Alice's spendable transaction (as described above).
2. Transaction Template—A partially complete blockchain transaction comprising (at least) Bob's output address and the amount of cryptocurrency being requested from Alice. In order for the transaction to be completed, Alice's offline wallet must provide (at least) the TXID from her unspent transaction output, a valid signature for each of the spendable TX outputs to be used, and a change address.
3. Merkle Path—When combined with the full, completed transaction, a Merkle proof can be constructed to verify that Alice's TX is included in a block and is therefore valid Note that, in the simplest case, Alice needs to provide Bob with a valid payment transaction Tx3 in exchange for the goods at the P-o-S. In accordance with at least one embodiment of the invention, Bob provides the merchant template to facilitate this but it is also conceivable that a template is not used. For example, if Alice already knows the price and Bob's address beforehand, she can construct her payment and transmit it directly to Bob. Alice could also provide the required signatures and outpoint references without explicitly 'filling-in' the template itself.

The full transaction (see (1) in FIG. 4) and Merkle proof (see (3) in FIG. 4) can be sent by Alice and processed by Bob. This can be done in parallel with, and independently to, Alice completing Bob's template (see (2) in FIG. 4).

Delayed Transaction Submission:

In some cases, such as for an online retailer, it may be advantageous to submit payment transactions in batches at regular intervals. This may be beneficial for technical reasons such as waiting for improved/optimal network connectivity to be available etc., for accounting purposes or for reducing the total value of transactions fees incurred.

For the merchant, Bob, this presents no additional challenge but for the customer, Alice, this means that the cryptocurrency associated with Alice's change address is not available for her to use until Bob eventually submits the signed transaction to the network.

A solution to the problem would be for Bob to specify the artificial delay in processing a transaction within the template that he provides to Alice. Alice's offline wallet can interpret this as meaning that the change generated by the payment to Bob will be unavailable to spend during the merchant's pre-determined time before submitting their batched transactions to the network. It should be noted that there is no additional risk for Bob in this scenario, as the delivery of the purchased goods can be cancelled if the merchant finds evidence of a double-spend before he submits the batch of transactions.

Extension to the PoS SPV Wallet—Split Wallet

As an extension to the PoS SPV wallet described above, it may be desirable for Bob to utilise several connected wallets, with different functions, which can be treated as single a split-wallet system.

Therefore, certain embodiments of the invention build on the basic concept of the point of sale (P-o-S) SPV by introducing a more advanced master SPV which can coordinate one or many point of sale wallets. The combination of a master SPV with one or more P-o-S SPVs will be considered a "split wallet" system herein.

The split-wallet system in accordance with embodiments of the invention comprises at least one PoS SPV wallet, acting as a payment terminal, coordinated by a master SPV component. The functionality of a master SPV enables the wallet to:

Store the private keys associated with the public key addresses of a P-o-S SPV.
Compute Merkle proofs associated with block headers.
Connect and broadcast to the blockchain network, including queries of the UTXO set.
Communicate with at least one PoS SPV wallet serving as a payment terminal.

As with all simple payment verification systems, the master wallet should be able to perform all the basic functions of a good SPV, such as checking the Merkle proof of existence for a given transaction. This means that Bob can check that any transaction he broadcasts from the point of sale has been accepted by the network and included in a block. Importantly, however, a master wallet in accordance with an embodiment of the present invention communicates with, and coordinates the payments processed by, at least one simpler PoS SPV wallet.

It can be advantageous for the master SPV to store the private keys for Bob's payment addresses. This allows Bob to have much greater security over his payment processing when using a split-wallet system. However, storing of Bob's private keys is an optional capability of the master wallet and its primary function is to aggregate and coordinate payments from multiple point of sale wallets.

In this implementation of a merchant split-wallet—using only a basic master SPV—the merchant-customer interaction is not strictly modified. The PoS SPV wallet must still perform the same checks on Merkle paths and make the same queries to the network about the UTXO set. The differences in the process include:

Choice of P-o-S SPV terminal to be used by Alice and Bob.
Master SPV should continuously synchronise with the blockchain in the background.
The private keys associated with Bob's payment addresses receive dedicated management from the master wallet. This adds structure to the security that was previously introduced by only storing public key addresses at the point of sale wallet.

It should be noted that a master wallet used as part of a split-wallet implementation would typically reside in a separate location to the point of sale SPVs, such as a company back office or head office, for both security concerns and pragmatism. The merchant-customer interaction can be visualised as shown in FIG. 5.

As discussed, this implementation using a simple master SPV as part of a merchant split-wallet has utility for the Bob, but still relies on the network for responding to queries of the UTXO set if the split-wallet it to provide a suitable level of double-spend protection.

This may be addressed in accordance with one or more embodiments, in which the master SPV is replaced with a more powerful type of master wallet which also keeps its own copy of the mempool. The split-wallet architecture equipped with such a master wallet does not need to query the network to check if a customer's UTXOs are part of the current UTXO set.

A master wallet with its own copy of the mempool functions similarly to a classical non-mining 'full node' client but, advantageously, it does not need to keep a full copy of the blockchain. Instead, this type of master wallet keeps only the block headers and its own local copy of the mempool. The copy of the mempool can either be constructed locally by synchronising with the network or sourced from a trusted third party or service.

The implementation of the split-wallet using a master SPV wallet with its own copy of the mempool changes the merchant-customer interaction from the perspective of the merchant. The primary change in the interaction from that described above in relation to FIG. 5 is manifested in steps 4 and 5:

In step 4, the merchant only broadcasts the transaction to the network, rather than adding the additional query of the UTXO set
In step 5, the merchant now performs his own check on the validity of the customer's transaction by checking the mempool for a conflicting transaction. The merchant can then decide what action to take based on the state of his synchronised copy of the mempool.

Illustration of the Invention in Use

Consider a typical merchant-customer interaction where Alice would like to buy something from Bob. In accordance with an embodiment of the invention, the process is performed as outlined below, and with reference to FIG. 6:

1. Bob creates a partially complete blockchain transaction and requests the following information from Alice. This could be packaged together as a template for Alice to fill in:
   a. The TX outputs Alice will spend in order to complete the purchase
   b. A (Bitcoin) change address for Alice c. A signature from Alice
d. the Merkle path for the TXs (this does not form part of the transaction)
2. Alice completes the template by providing the required information.
3. Bob performs the Merkle proofs to check the validity of the TXs Alice has provided. If the proofs are not valid Bob knows that Alice's TXs have never been valid in the blockchain and he rejects the transaction. Advantageously, this is a fail-fast mechanism.
4. Bob broadcasts the complete transaction to the network and queries the UTXO set.
   a. The broadcast allows miners to begin attempts to mine the transaction into a block.
   b. The query asks whether the ostensibly valid UTXOs provided by Alice are still in the UTXO set.

This is a mechanism for the prevention of a double-spend by Alice.

5. The network responds to Bob's UTXO query. This allows Bob to take one of the following courses of action:
   a. If Alice's UTXOs are still part of the UTXO set, Bob can accept the payment with minimal risk of a double spend.
      i. The risk taken by Bob can be minimised by continuing to poll network nodes with this query for some time interval τ.
      ii. Bayesian analysis can be leveraged to ensure Bob queries an honest majority of nodes, within some confidence interval.
   b. If Alice's UTXOs are not part of the UTXO set, Bob rejects Alice's payment.

As mentioned above, embodiments of the invention lend themselves for use and implementation in a variety of forms. These can include payment cards, for example.

As known in the art, a traditional SPV wallet verifies that a transaction is not a double spend by checking its depth within the blockchain, which it does by querying the network. Once a transaction has been validated by a miner and is included in a block the transaction has 1 confirmation. Every additional block added to the blockchain increases the confirmation by 1 and with each new confirmation the risk of a double spend is decreased. A traditional SPV wallet will display a transaction as "n/unconfirmed" until it has 6 confirmations.

However, the default 6 confirmation rule is not fundamental to Bitcoin. Not all merchants want to wait for 6 blocks (or even 1 block) to be generated before being satisfied with payment. "0-conf" is the term used in the art to denote a transaction that has not yet been included in a block. Once Alice completes her transaction she broadcasts it to the network and Bob should (at the very least) be able to find it in the mempool.

The present invention shifts the burden of broadcasting the transaction to the receiver, Bob, rather than the sender, Alice, thus minimising the CPU required and improving the experience for Alice. Bob has a greater degree of control over the transaction process as he does not need to rely on Alice's connection to the network, but not enough control to compromise Alice's security. Essentially, Alice (only) has the authority to accept or reject the transaction by providing a digital signature.

The Merkle path check does not prevent double spending as 0-conf is only reached once Bob can see that the transaction being relayed by the network and is in the mempool. Instead, it acts as a fail-fast mechanism allowing Bob to instantly reject attempts to spend non-existent UTXOs. This is useful as it prevents Bob being used as an intermediary for spam attacks, especially since the time taken to broadcast and then query a full node may take more than a few seconds if the connection is poor.

With offline payments enabled, hardware such as pre-paid smart cards can be integrated into the bitcoin ecosystem. The payment card would require data capacity to store private keys as well as the UTXOs, complete transactions and Merkle paths. It would also require some processing power in order to implement the ECDSA signing algorithm. Table 1 shows a list of some electronic card types available at the time of filing.

TABLE 1

Typical payment card specifications

| | Maximum Data Capacity | Processing Power | Cost of Card (USD) | Cost of Reader/ Connection |
|---|---|---|---|---|
| Magnetic Stripe Cards | 140 bytes | None | $0.20-$0.75 | $750 |
| Integrated Circuit Memory Cards | 1 kB | None | $1-$2.50 | $500 |
| Integrated Circuit Processor Cards | 8 kB | 8-bit CPU (Future expansion up to 23-bit) | $7-$15 | $500 |

Double Spend Protection

Suppose that a customer, Alice, wishes to exchange cryptocurrency for physical goods in a shop. Traditionally, Alice sends a transaction to the blockchain network at the point-of-sale (POS) and Bob, the merchant, only allows Alice to leave with the goods when he sees this transaction either
   (a) gossiped back to him as accepted by the network; or
   (b) confirmed in a block (or n blocks deep for n-conf).

In scenario (a) Bob knows that Alice's payment transaction to him is valid and miners will attempt to mine this payment into a block. Although this does not protect Bob from a simple double-spend initiated by Alice remotely submitting a conflicting transaction, this scenario is compatible with a conventional block-header based SPV.

In scenario (b) Bob knows that the payment transaction is both valid and has not been double-spent. However, this requires Bob to run a full-node and download the next block(s) in-situ. Also, on the Bitcoin network this will take an average of 10 minutes before Alice may leave the premises with the goods.

It should be noted that in this problem statement, we assume that 0-conf security is satisfactory for Bob as the attack we are trying to mitigate is a simple double-spend by Alice. To require one or more blocks is to mitigate a different attack vector—that of a third adversary, Carol, overpowering the entire network.

The following table illustrates how neither scenario (a) nor (b) are independently acceptable for such a customer-merchant interaction. This table shows the transaction features of scenario a) and b):

| Factor | Scenario (a) | Scenario (b) |
|---|---|---|
| Double-spend protection for Bob | Not | Acceptable |
| <10 s average transaction time | Acceptable | Not |
| <10 m average transaction time | Acceptable | Not |

| Factor | Scenario (a) | Scenario (b) |
|---|---|---|
| SPV compatible* (Bob) | Acceptable | Not Acceptable |
| SPV compatible* (Alice) | Acceptable | Acceptable |

*This means that there is no full-node requirement on this party. Only a solution which meets all of these criteria is acceptable for both Bob (merchant) and Alice (customer) for most transactions.

Embodiments of the merchant PoS wallet disclosed herein provides the following advantages:
Double-spend protection for merchant
Instant (<<10 s) average transaction time
Customer and merchant can both use SPV wallets at the point of sale.

| Factor | Scenario (a) | Scenario (b) | Merchant SPV |
|---|---|---|---|
| Double-spend protection for Bob | No | Yes | Yes |
| <10 s average transaction time | Yes | No | Yes |
| <10 m average transaction time | Yes | No | Yes |
| SPV compatible* (Bob) | Yes | No | Yes |
| SPV compatible* (Alice) | Yes | Yes | Yes |

It is envisaged that embodiments of the invention are able to provide performance and results which would be a significant improvement over existing SPV/cryptocurrency transaction rates, and at least rival existing chip-and-pin/contactless terminal payment interactions in terms of instantaneity.

Moreover, the invention also provides allows payments to be considered cleared and approved with a high degree of certainty within approximately one hour (i.e. 6-conf). This is far superior to the current payment clearing times of up to 60-days i.e. VISA and Mastercard clearing times.

Variable Risk

As a merchant, Bob can calibrate the latency for accepting a payment at the point of sale. By choosing the minimum polling time interval τ he also sets the probabilistic upper bound on the risk of a double-spend acceptable to him. This can allow for greater efficiency and flexibility in payment processing for merchants.

In addition, Bob can set the mining fee for the transaction when generating the template. It does not necessarily matter who pays this fee, but the value can be used as a parameter for setting the risk of double-spend to a level deemed acceptable by the merchant.

In total the point of sale time delay and the mining fee for the transaction are two parameters that can be set by the merchant and consented to by the customer's digital signature that can effectively calibrate the efficiency and risk on a case-by-case basis. This may depend, for example, on the value of the goods to be exchanged, Turning now to FIG. 7, there is provided an illustrative, simplified block diagram of a computing device 2600 that may be used to practice at least one embodiment of the present disclosure. In various embodiments, the computing device 2600 may be used to implement any of the systems illustrated and described above. For example, the computing device 2600 may be configured for use as a data server, a web server, a portable computing device, a personal computer, or any electronic computing device. As shown in FIG. 7, the computing device 2600 may include one or more processors with one or more levels of cache memory and a memory controller (collectively labelled 2602) that can be configured to communicate with a storage subsystem 2606 that includes main memory 2608 and persistent storage 2610. The main memory 2608 can include dynamic random-access memory (DRAM) 2618 and read-only memory (ROM) 2620 as shown. The storage subsystem 2606 and the cache memory 2602 and may be used for storage of information, such as details associated with transactions and blocks as described in the present disclosure. The processor(s) 2602 may be utilized to provide the steps or functionality of any embodiment as described in the present disclosure.

The processor(s) 2602 can also communicate with one or more user interface input devices 2612, one or more user interface output devices 2614, and a network interface subsystem 2616.

A bus subsystem 2604 may provide a mechanism for enabling the various components and subsystems of computing device 2600 to communicate with each other as intended. Although the bus subsystem 2604 is shown schematically as a single bus, alternative embodiments of the bus subsystem may utilize multiple busses.

The network interface subsystem 2616 may provide an interface to other computing devices and networks. The network interface subsystem 2616 may serve as an interface for receiving data from, and transmitting data to, other systems from the computing device 2600. For example, the network interface subsystem 2616 may enable a data technician to connect the device to a network such that the data technician may be able to transmit data to the device and receive data from the device while in a remote location, such as a data centre.

The user interface input devices 2612 may include one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 2600.

The one or more user interface output devices 2614 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 2600. The one or more user interface output devices 2614 may be used, for example, to present user interfaces to facilitate user interaction with applications performing processes described and variations therein, when such interaction may be appropriate.

The storage subsystem 2606 may provide a computer-readable storage medium for storing the basic programming and data constructs that may provide the functionality of at least one embodiment of the present disclosure. The applications (programs, code modules, instructions), when executed by one or more processors, may provide the functionality of one or more embodiments of the present disclosure, and may be stored in the storage subsystem 2606. These application modules or instructions may be executed by the one or more processors 2602. The storage subsystem 2606 may additionally provide a repository for storing data used in accordance with the present disclosure. For example, the main memory 2608 and cache memory 2602 can provide volatile storage for program and data. The persistent storage 2610 can provide persistent (non-volatile) storage for program and data and may include flash memory, one or more solid state drives, one or more magnetic hard disk drives, one or more floppy disk drives with associated removable media, one or more optical drives (e.g. CD-ROM or DVD or Blue-Ray) drive with associated removable media, and other like storage media. Such program and data can include programs for carrying out the steps of one or more embodiments as described in the present disclosure as well as data associated with transactions and blocks as described in the present disclosure.

The computing device 2600 may be of various types, including a portable computer device, tablet computer, a workstation, or any other device described below. Additionally, the computing device 2600 may include another device that may be connected to the computing device 2600 through one or more ports (e.g., USB, a headphone jack, Lightning connector, etc.). The device that may be connected to the computing device 2600 may include a plurality of ports configured to accept fibre-optic connectors. Accordingly, this device may be configured to convert optical signals to electrical signals that may be transmitted through the port connecting the device to the computing device 2600 for processing. Due to the ever-changing nature of computers and networks, the description of the computing device 2600 depicted in FIG. 7 is intended only as a specific example for purposes of illustrating the preferred embodiment of the device. Many other configurations having more or fewer components than the system depicted in FIG. 7 are possible.

The term "blockchain transaction" may be used to refer to a data structure which implements the use of a cryptographic key to achieve transfer of control of a digital resource or asset via a blockchain network. As stated above, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions. It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc.

Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of blocks in the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from the entity using the blockchain to maintain a ledger of transactions.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". "Operative" or "operative to" includes "arranged/arranged to" and "configured/configured to". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A blockchain implemented Simplified Payment Verification system operative to facilitate a transfer of an asset on or over a blockchain that is maintained by a blockchain network between a first verification resource of a transferor and a second verification resource of a transferee, and wherein:

the first verification resource is operative to send, to the second verification resource:
data relating to a payment transaction (Tx3) that comprises an output that transfers the asset to the transferee;
complete transaction data relating to at least one blockchain transaction (Tx1) that comprises an unspent output that is spendable by an input of the payment transaction (Tx3); and
the complete Merkle path of the at least one blockchain transaction (Tx1);

and the second verification resource is operative to:
at least one of receive or request, from the first verification resource, the complete transaction data relating to the at least one blockchain transaction (Tx1); and the complete Merkle path for the at least one blockchain transaction (Tx1);
use the Merkle path and the complete transaction data relating to the at least one blockchain transaction (Tx1) to provide a Merkle proof for the at least one transaction, and use the Merkle proof to verify, at the second verification resource and without interaction with the blockchain network, that the at least one blockchain transaction (Tx1) has been processed by the blockchain network and mined into a block on the blockchain; and upon successful verification of the Merkle proof, send the payment transaction (Tx3) to the blockchain network to transfer the asset from the transferor to the transferee.

2. The system of claim 1, wherein at least one of the first or second verification resources are or comprise at least one of a smart card, digital wallet and lightweight wallet or an SPV wallet.

3. The system of claim 1, wherein the second verification resource is operative to at least one of receive or request, from the first verification resource, the complete transaction data and the complete Merkle path for the at least one transaction (Tx) using an off-chain communication.

4. The system of claim 1, wherein the system is operative to:

use the complete Merkle path to verify a Merkle proof for the at least one blockchain transaction and, upon successful verification, send the payment transaction (Tx3) to the blockchain network.

5. The system of claim 1, wherein the system further comprises a plurality of second verification resources, and a coordination component operative to communicate with the plurality of second verification resources.

6. The system of claim 1, wherein the second verification resource is also operative to at least one of receive or request from the first verification resource, or the first verification resource is also operative to send to the second verification resource at least one of:

a signature for spending an output of the at least one blockchain transaction;

a transfer value; or a public key address.

7. A blockchain implemented method of Simplified Payment Verification to facilitate a transfer of an asset on or over a blockchain that is maintained by a blockchain network between a first verification resource of a transferor and a second verification resource of a transferee, the method comprising:

receiving, at a second verification resource:
 i) a payment transaction (Tx3) that comprises an output that transfers the asset to the transferee;
 ii) complete transaction data relating to at least one blockchain transaction (Tx1) that comprises an unspent output that is spendable by an input of the payment transaction (Tx3), and
 iii) the complete Merkle path of the at least one blockchain transaction;

wherein the complete transaction data and the complete Merkle path of the at least one blockchain transaction (Tx1) are received from the first verification resource which stores the complete transaction data and the complete Merkle path for the at least one transaction (Tx1);

and wherein the method further comprises the steps of:
 using the complete transaction data and the complete Merkle path for the at least one transaction (Tx1) to provide a Merkle proof for the at least one blockchain transaction (Tx1), and use the Merkle proof to verify, at the second verification resource and without interaction with the blockchain network, that the at least one blockchain transaction (Tx1) has been processed by the blockchain network and mined into a block on the blockchain; and
 sending the payment transaction (Tx3) to the blockchain network upon successful verification of the Merkle proof, to transfer the asset from the transferor to the transferee.

8. The method of claim 7, wherein the following steps are performed off-chain:
 i) verification of the Merkle proof; and/or
 ii) receiving or requesting the complete transaction data and Merkle path of the at least one transaction (Tx1) from the first verification resource.

9. The method of claim 7, wherein
the first and/or second verification resources are or comprise at least one of a smart card, digital wallet, a lightweight wallet, or SPV wallet.

10. A non-transitory computer-readable storage medium having stored thereon executable instructions that, as a result of being executed by a processor of a computer system, cause the computer system to perform the steps of:

receiving, at a second verification resource of an asset transferee:
 i) data relating to a payment transaction (Tx3) that comprises an output that transfers the asset to the transferee on or over a blockchain that is maintained by a blockchain network;
 ii) complete transaction data relating to at least one blockchain transaction (Tx1) that comprises an unspent output that is spendable by an input of the payment transaction (Tx3), and
 iii) the complete Merkle path of the at least one blockchain transaction;

wherein the transaction data and the complete Merkle path of the at least one transaction (Tx1) are received from a first verification resource of an asset transferor which stores the transaction data and the complete Merkle path of the at least one transaction (Tx1); and;

using the complete Merkle path and the complete transaction data of the at least one transaction (Tx1) to provide a Merkle proof for the at least one blockchain transaction, and verifying, at the second verification resource and without interaction with the blockchain network, that the at least one blockchain transaction (Tx1) has been processed by the blockchain network and mined into a block on the blockchain; and sending a further transaction (Tx3) to the blockchain upon successful verification of the Merkle proof, the payment transaction to transfer the asset from the transferor to the transferee over the blockchain network.

11. The computer readable medium of claim 10, wherein the following steps are performed off-chain:
 i) verification of the Merkle proof; and/or
 ii) receiving or requesting the complete transaction data and complete Merkle path of the at least one transaction (Tx1) from the first verification resource.

12. The computer readable medium of claim 10, wherein the first and/or second verification resources are or comprise at least one of a smart card, digital wallet, a lightweight wallet, or SPV wallet.

* * * * *